No. 654,947. Patented July 31, 1900.
J. F. CHAMPLIN.
PIGEON TRAP.
(Application filed Nov. 20, 1899.)
(No Model.) 2 Sheets—Sheet 1.

Witnesses. Inventor.
L. M. Billings. Justin F. Champlin.
G. A. Neubauer. By A. J. Sangster, Attorney.

THE NORRIS PETERS CO., PHOTO-LITHO., WASHINGTON, D. C.

No. 654,947. Patented July 31, 1900.
J. F. CHAMPLIN.
PIGEON TRAP.
(Application filed Nov. 20, 1899.)
(No Model.) 2 Sheets—Sheet 2.
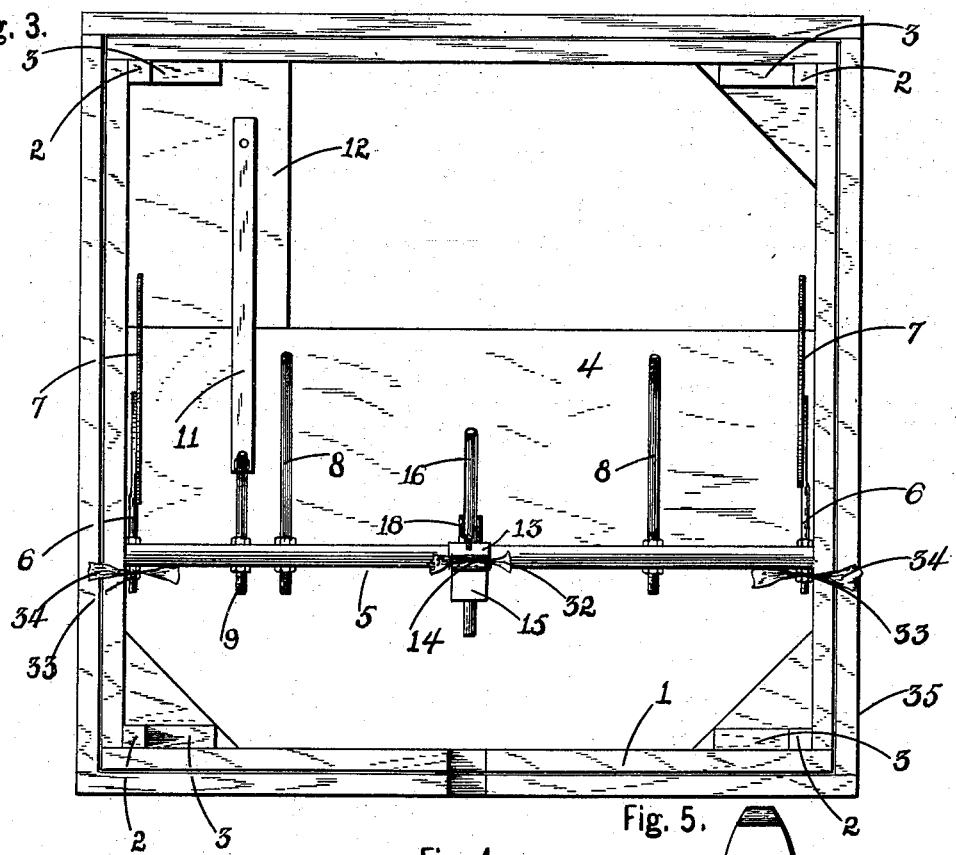
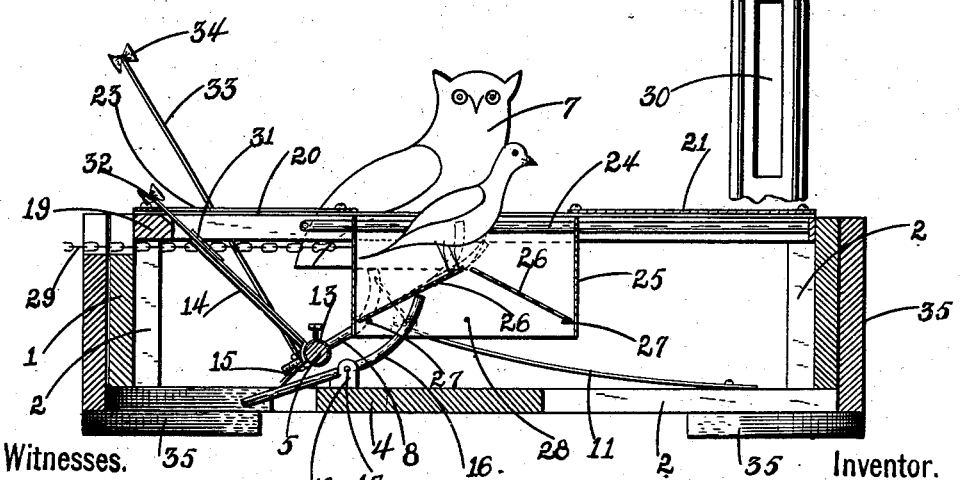
Witnesses.
L. M. Billings.
G. A. Neubauer.
Inventor.
Justin F. Champlin.
By A. J. Sangster. Attorney.

UNITED STATES PATENT OFFICE.

JUSTIN F. CHAMPLIN, OF BUFFALO, NEW YORK.

PIGEON-TRAP.

SPECIFICATION forming part of Letters Patent No. 654,947, dated July 31, 1900.

Application filed November 20, 1899. Serial No. 737,561. (No model.)

*To all whom it may concern:*

Be it known that I, JUSTIN F. CHAMPLIN, a citizen of the United States, residing at Buffalo, in the county of Erie and State of New York, have invented certain new and useful Improvements in Pigeon-Traps, of which the following is a specification.

My invention relates to an improved pigeon-trap which can be loaded either from the top or bottom and is equally adapted both as a pit or ordinary ground trap; and the object of the invention is to provide a cheap and quickly-operated trap of the above description.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1:
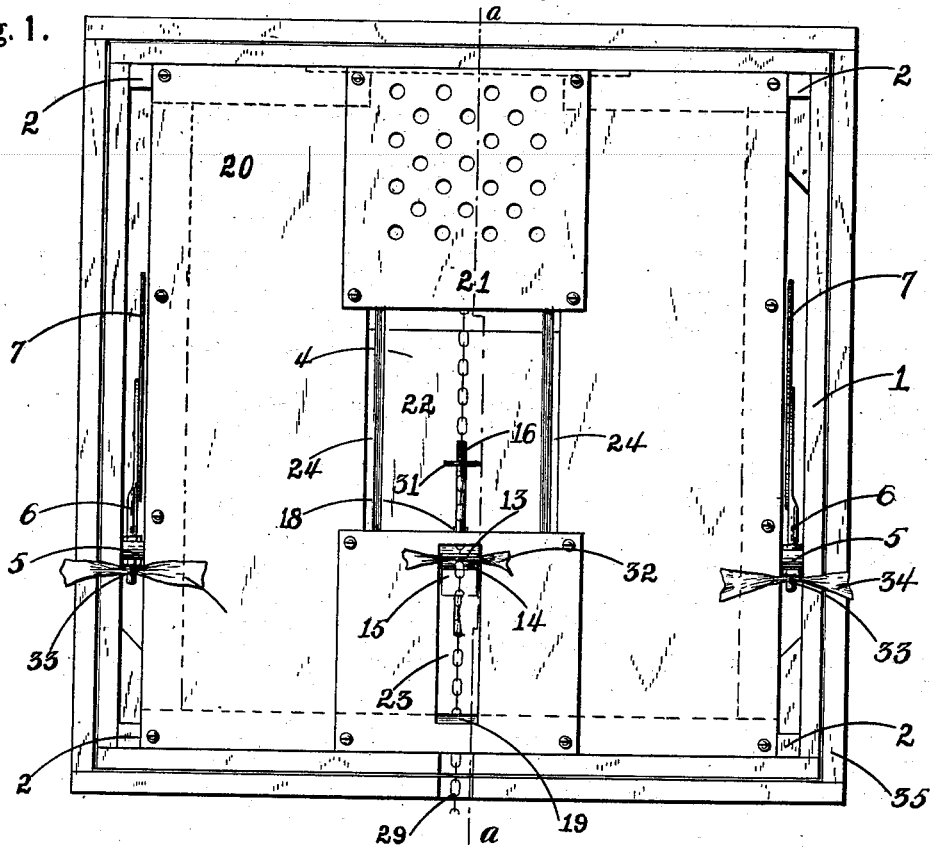
Figure 2:
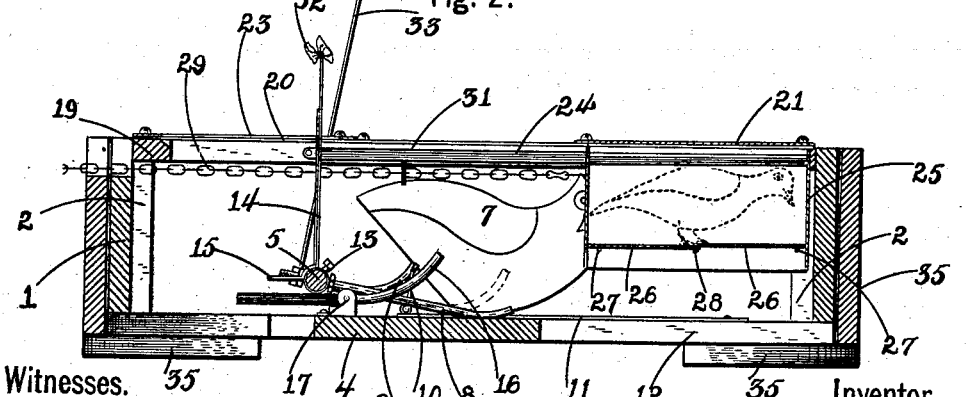

Figure 1 represents a top plan view of my improved trap complete. Fig. 2 is a vertical section on line *a a*, Fig. 1, with the pigeon-holding receptacle in its closed position ready to be opened at the word from the shooter. Fig. 3 is a top plan view with the upper portion of the trap removed to expose the operating mechanism. Fig. 4 is a section on or about line *a a*, Fig. 1, with the trap pulled and the bird released and ready to fly. Fig. 5 is an enlarged detached view of a portion of the vertical strip, showing the longitudinal opening through which the chain passes.

In referring to the drawings in detail like numerals designate like parts.

The trap is formed in two portions—a top portion and a bottom portion.

The bottom portion is formed of a substantially-square frame 1, provided at each corner with a block 2, having a cut-away portion to form a depression 3, in which the corner of the top portion seats. A bottom board or plate 4 extends transversely across the bottom of the frame and forms a support for the operating mechanism. The operating mechanism comprises a shaft 5, having its ends journaled in the sides of the frame, a series of rods or arms rigidly mounted on said shaft, and a spring for normally maintaining said shaft in operating position and returning it to said position after the pressure on the pulling-rope has been relaxed. The outer rods or arms 6 each carry an image or similar device 7 to aid in frightening a particularly-sluggish bird, and the inner rods 8 serve to increase the frightening effect by rapping or striking against the under surface of the top portion. The lever 9, which is rigidly fastened to the shaft, is connected by the link 10 with the spring 11, which in this instance is a flat spring fastened at one end to an extension 12 of the bottom band or plate 4. A collar 13 is rigidly fastened to the middle portion of the shaft and is provided with a vertical lug or strip 14 and a horizontal lug or strip 15. A tilting bar 16, provided with side extensions or bearing portions 17, journaled in the forks of the forked portion 18, attached to the bottom board or plate 4, has its forward end projecting beneath the horizontal lug or strip 15.

The upper portion is formed of a substantially-square frame 19, the corners of which are adapted to seat in the depression 3, and a top 20, which may be formed of one or several pieces. The top is provided with a perforated portion 21, directly above the bird-holding receptacle when closed, to afford air circulation, a central square-shaped aperture 22, and a rectangular aperture or opening 23. Two rods 24 are arranged beneath the top, with their ends connected thereto and parallel to each other and one on each side of the central aperture 22. The bird-holding car or receptacle is provided with openings in its sides, through which said rods pass, and is adapted to travel on said rods. The car or receptacle has sides 25 and two plates 26, forming a bottom, which are mounted near their outer ends on the horizontal shafts 27, journaled in the sides, and have their inner ends overlap and are limited in their downward movement by the cross-bar 28. An operating rope or chain 29 is attached to the forward end of the car and passes through a longitudinal opening 30 in the vertical strip 14 and forward to the operator. An enlargement or collar 31 is mounted upon the rope or chain 29 behind the strip 14, which strikes against the sides of the opening 30 when the rope or chain is pulled and rotates or partially rotates the shaft. The upper end of the strip 14 extends through the rectangular opening 23 in the top and carries a portion of cloth or other material 32 at its top. Two vertical rods 33 are also mounted on the shaft 5 and carry cloth portions or similar devices 34 at their upper ends.

The operation of the device is as follows: The car or receptacle being beneath the perforated portion and the bird within, the shooter calls "pull" and the rope or chain 29 is drawn forward, sliding the car forward on the rods 24 into the central aperture. At the same time the rope or chain, by means of the enlargement 31, draws the strip 14 forward and partially rotates the shaft against the tension of the spring, thereby agitating the rods and bars connected to the shaft. This raises the images 7 above the top, as shown in Fig. 4, causing the rods 8 to rap against the under surface of the top portion and the forward end of the tilting bar 14 to strike the under portion of the bottom plates 26 of the car and partially raise them. The vertical rods 33 and the strip 14 are also vibrated, thereby giving notice to the shooter as to which trap is pulled and also assisting in frightening the bird. The trap is loaded by putting the bird in either through the top or bottom. The trap is preferably mounted in another box 35, which is placed in the ground and from which it can be removed when desired. Should the bird fail to fly immediately after pulling the trap, the operator can by giving the rope or chain a series of jerks or pulls cause the upright rods and their cloth-flag portions to shake or vibrate back and forth, the images to move up and down, the vertical strip to move forward and backward, the tilting lever to strike a series of blows against the under surface of the pivotal bottom portions of the bird car or receptacle, causing them to rise and fall beneath the bird, and the inner rods to strike a series of raps or blows against the under surface of the top portion, the spring serving to return the shaft and the above devices to their original position immediately after the release of the pulling pressure.

I claim as my invention—

1. A pigeon-trap comprising a body having an upper opening, an open-top non-collapsible car or receptacle mounted in said body, and having a range of movement therein and means for moving said car to bring its open top beneath the upper opening and thereby release the bird.

2. A pigeon-trap comprising a body, and a non-collapsible car or receptacle mounted in said body and adapted to have a bird placed therein either through the top or bottom.

3. A pigeon-trap comprising a bottom portion, a shaft journaled in said portion, frightening devices mounted on said shaft, a top portion having a central opening, rods mounted beneath said top portion, a car or receptacle for the bird supported and traveling on said rods, and an operating rope or chain attached to the car and having operative connection with the shaft.

4. A pigeon-trap comprising a top portion having a perforated part, a central opening and a rectangular opening, two rods arranged parallel to each other and one on each side of the central opening, a car or receptacle supported and traveling on said rods, a bottom portion having a bottom plate, a shaft journaled in said bottom portion, rods mounted on said shaft, a collar mounted at or near the middle of the shaft, a vertical strip and a horizontal strip projecting from said collar; said vertical strip having a longitudinal slot, a chain or rope attached to the car and passing through the longitudinal slot in said vertical strip and an enlargement on said rope or chain, as set forth.

5. A pigeon-trap comprising a top portion having a perforated part, a central opening and a rectangular opening, two rods arranged parallel to each other and one on each side of the central opening, a car or receptacle supported and traveling on said rods, and having two pivoted bottom plates, a bottom portion having a bottom plate, a shaft journaled in said bottom portion, a series of bars, rods and levers mounted on said shaft and comprising outer rods having images, inner rods adapted to rap against the under surface of the top portion, vertical bars having cloth portions at their top, and a lever, a spring, a link connecting the lever to the spring, a collar mounted at or near the middle of the shaft, a vertical strip and a horizontal strip projecting from said collar; said vertical strip having a longitudinal slot, a chain or rope attached to the car and passing through the longitudinal slot in said vertical strip and an enlargement on said rope or chain, as set forth.

6. A pigeon-trap comprising a body, a top opening, rods mounted in said body, a car or receptacle for the bird supported and traveling on said rods, and an operating rope or chain attached to the car and adapted to move the car relatively to the opening in the body to release the bird.

7. A pigeon-trap comprising a body having a top portion having a perforated part and a bird-releasing opening, a rod mounted in said body on each side of the opening, and a car or receptacle supported and traveling on said rods, and adapted to retain a bird when beneath the perforated part and to release the bird when beneath the bird-releasing opening.

8. A pigeon-trap comprising a body having a top portion having a perforated part and a bird-releasing opening, a rod mounted in said body on each side of the opening, and a car or receptacle supported and traveling on said rods and having a movable bottom for the introduction of the bird, and adapted to retain a bird when beneath the perforated part and to release the bird when beneath the bird-releasing opening.

9. A pigeon-trap comprising a body, and a non-collapsible car or receptacle mounted in said body and having a movable bottom for the introduction of a bird and an open top, and adapted to be arranged to retain a bird and to be moved in the body to release the bird, as set forth.

JUSTIN F. CHAMPLIN.

Witnesses:
L. M. BILLINGS,
G. A. NEUBAUER.